United States Patent
Berggren et al.

(10) Patent No.: US 11,862,975 B2
(45) Date of Patent: Jan. 2, 2024

(54) POWER TRANSFER BETWEEN MV FEEDERS IN A POWER DISTRIBUTION NETWORK

(71) Applicant: ABB Schweiz AG, Baden (CH)

(72) Inventors: Bertil Berggren, Västerås (SE); Ritwik Majumder, Västerås (SE); Lidong Zhang, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/758,528

(22) PCT Filed: Jan. 10, 2020

(86) PCT No.: PCT/EP2020/050566
§ 371 (c)(1),
(2) Date: Jul. 8, 2022

(87) PCT Pub. No.: WO2021/139896
PCT Pub. Date: Jul. 15, 2021

(65) Prior Publication Data
US 2023/0132007 A1 Apr. 27, 2023

(51) Int. Cl.
*H02J 3/06* (2006.01)
(52) U.S. Cl.
CPC ..................... *H02J 3/06* (2013.01)
(58) Field of Classification Search
CPC ............... H02J 3/06; H02J 3/36; Y02E 60/60
See application file for complete search history.

(56) References Cited

U.S. PATENT DOCUMENTS

| | | | | |
|---|---|---|---|---|
| 2012/0112713 A1* | 5/2012 | Kuehn | ...................... | H02J 3/24 323/207 |
| 2017/0009738 A1* | 1/2017 | Brogan | ................... | F03D 9/255 |

(Continued)

FOREIGN PATENT DOCUMENTS

| CN | 102033999 A | 4/2011 |
|---|---|---|
| CN | 108573454 A | 9/2018 |
| WO | 2018223228 A1 | 12/2018 |

OTHER PUBLICATIONS

Roytelman, Ilya, et al.; "State Estimation for Electric Power Distribution Systems in Quasi Real-Time Conditions"; IEEE Transactions on Power Delivery, vol. 8, No. 4; Oct. 1993; 7 Pages.

(Continued)

*Primary Examiner* — Ziaul Karim
(74) *Attorney, Agent, or Firm* — Whitmyer IP Group LLC

(57) ABSTRACT

A method for transferring power between medium voltage feeders via a direct current link in a power distribution network includes setting an iteration step value for each of a set of power reference quantities of the link, setting an initial value of each reference quantity, iteratively changing values of each reference quantity, and selecting one changed value of the set by: changing a present value of each reference quantity with the set iteration step value into a new value, measuring a total active power at a substation of the power distribution network for each new value, and selecting the new value that provides the lowest measured total active power at the substation. A next iteration is performed with the selected new value as present value for the one of the set of power reference quantities and with the present value for the other of the set of power reference quantities.

14 Claims, 7 Drawing Sheets

(56) References Cited

U.S. PATENT DOCUMENTS

2018/0278060 A1\* 9/2018 Sun .......................... H02J 3/42
2021/0006068 A1\* 1/2021 Gupta ................... H02J 3/0012

OTHER PUBLICATIONS

Sakis Meliopoulos, A. P., et al.; "Multiphase Power Flow and State Estimation for Power Distribution Systems"; IEEE Transactions on Power Systems, vol. 11, No. 2; May 1996; 8 Pages.

Long, Chao, et al.; "MVDC Link in a 33 kV Distribution Network"; 24th International Conference on Electricity Distribution; CIRED; Glasgow, Scotland; Jun. 12, 2017; 6 Pages.

Hrishikesan, V. M., et al.; "Flexible Power Transfer in Smart Transformer Interconnected Microgrids"; IECON 2018, 44th Annual Conference of the IEEE Industrial Electronics Society; Oct. 21, 2018; 6 Pages.

Qiao, Lei, et al.; "Coordinated control for medium voltage DC distribution centers with flexibly interlinked multiple microgrids"; Journal of Modern Power Systems and Clean Energy, vol. 7, No. 3; Oct. 25, 2018; 13 Pages.

International Search Report and Written Opinion of the International Searching Authority; Application No. PCT/EP2020/050566; Completed: Apr. 2, 2020; dated Apr. 16, 2020; 12 Pages.

International Preliminary Report on Patentability; Application No. PCT/EP2020/050566; dated Jul. 12, 2022; 7 Pages.

\* cited by examiner

POWER TRANSFER BETWEEN MV FEEDERS IN A POWER DISTRIBUTION NETWORK

TECHNICAL FIELD

The present disclosure relates to a method for transfer of power between MV feeders via a MVDC link in a power distribution network, and to a controller for performing the method.

BACKGROUND

It has been proposed to use back-to-back direct current (DC) links in medium voltage (MV) distribution networks in parallel to normally open (NO) switches, as indicated with MVDC1 in FIG. 1. The advantage with this arrangement is that it facilitates active power transfer between radial feeders in a power distribution network without closing the NO switches. Back-to-back DC links can also be installed between MV feeders, without being in parallel to NO switches, for the same purpose. The DC link may also have a DC cable in between the converters and thus not being strictly a back-to-back converter, as indicated with MVDC2 in FIG. 1.

The main reason for having the possibility to transfer power between MV feeders in a power distribution network is for enhancing power transfer capability. One factor why power capacity enhancement of existing MV networks is increasingly important is the foreseen large increase of electrical vehicles (EVs) that is expected to put more stress on e.g., urban MV distribution networks. Another factor is also to provide means for active power loss reduction in the feeder system.

The MV distribution network illustrated in FIG. 1 is fed with power from a high voltage (HV) network via one (or more) transformer(s). The transformer(s) are connected to a MV bus bar via a breaker (illustrated with an "x"). Further, MV feeders are also connected to the MV bus bar via breakers (also indicated by "x"). A substation where power is transformed from HV to MV is referred to as the primary substation. The MV feeder segments below the primary substation consist of cable segments between secondary substations. On each side of the cable segments, switches (indicated by filled squares) are available to disconnect the cable segments from the secondary substation. These switches can be breakers, load switches or even simple disconnectors. Further, in the secondary substations, loads are connected, either directly on the MV level, or as indicated in FIG. 1, connected on the low voltage (LV) side of transformers. The breakers in the primary substation (crosses) and the switches on the feeders (filled squares) are normally closed. There are also open switches (indicated by open squares) between the feeders. In this way the MV distribution network can be operated as a radial network, although it is meshed. The normally open (NO) switches are typically used in case of faults e.g., cable segment faults. Once the faulted cable segment is disconnected, the load below the faulted cable segment can then be served by closing the NO switches. In this way a radial feeder structure can be maintained both in normal operation and in case of faults.

The advantage with the MVDC links between MV feeders is that a controllable amount of active power can be transferred between the feeders, while maintaining the radial feeder structure.

A standard control structure for controlling an MVDC link between MV feeders in a power distribution network is described in connection with FIG. 2-4.

FIG. 2 indicates some AC/DC converter quantities which will be used when describing a standard type DC link control, where the following notation is used:

$P_{PCC}$, $Q_{PCC}$: Active and reactive power at the point of common coupling (PCC). The point of common coupling is where two MV feeders are coupled together, i.e. one PCC on each side of the MVDC link.

$V_{PCC}$: Voltage at PCC.
$I_v$: Valve current.
$V_f$: Voltage at converter side of transformer.
$X_r$: Phase reactor reactance (or equivalent).
$V_v$: Valve voltage.
$I_{dc}$: Converter direct current.
$V_{dc}$: Converter direct voltage.

A standard type of control for a DC-link is a so-called current vector control type. Its overall structure is illustrated in FIG. 3.

In a phase-locked-loop (PLL) the measured three-phase quantity $V_f$ is transformed into a dq-reference frame (with one component in d-direction $V_{fd}$ and one in q-direction $V_{fq}$), i.e. synchronized with $V_f$ such that a dq-transformation with $V_{fd}=V_f$ and $V_{fq}=0$ in steady state is obtained. An active power (AP)/DV control block is used either for control of active power at PCC or control of converter direct voltage, and the output of the control block is a valve current order in d-axis direction. The AP/DV controller is arranged to receive a reference $P_{PCC}$ value, a measured $P_{PCC}$ value, a reference $V_{dc}$ value and a measured $V_{dc}$ value to output an $I_{vd}^{ord}$ value in response thereto to a current control block.

Similarly, a reactive power (RP)/AV control block handles either control of reactive power at PCC or control of AC side voltage. the RP/AC controller is arranged to receive a reference $Q_{PCC}$ value, a measured $Q_{PCC}$ value, a reference $V_p$cc value and a measured $V_p$cc value to output an $I_{vq}^{ord}$ value in response thereto to the current control block.

The valve current orders are fed to the current controller which purpose is to translate the valve current orders to valve voltage references, while respecting valve current and modulation index limits. The current controller of the DC link is arranged to receive $I_{vd}^{ord}$, $I_{vq}^{ord}$, $I_{vd}$, $I_{vq}$, $V_{fd}$, $V_{fq}$, $V_{dc}$ to output $V_{vd}^{ref}$ and $V_{vq}^{ref}$ to a valve control block, to be effectuated therein.

An implementation of the AP/DV control block is described with reference to FIG. 4.

With $D_p=1$ and $D_v=0$ gives a control of constant active power character for $P_{PCC}$ adjusted with the reference $P_{PCC}$, and vice versa, $D_p=0$ and $D_v=1$ gives a constant direct voltage character for $V_{dc}$ adjusted with the reference $V_{dc}$. The PI block controller gains may need to be different for the two modes to obtain a desired control performance.

As indicated in FIG. 4, there is a lower $V_{dc}^{min}$ and upper $V_{dc}^{max}$ limit for the converter DC voltage range. The DC voltage is only allowed to be within this range at normal operation. The lower limit is required in order to satisfy the need to generate an AC voltage fulfilling AC system needs. The upper limit is required to make sure the DC side equipment can maintain insulation withstand.

Typically, for a DC-link, one converter is on active power control whereas the other is on DC voltage control. Whether the converters are on reactive power control or AC voltage control is dependent on system needs at each side of the converter.

With an MVDC link installed, losses in the two feeders to which it is connected may be reduced by a proper selection of references for the control, i.e. $P_{PCC}^{ref}$, $V_{dc}^{ref}$, $Q_{PCC}^{ref}$, $V_{AC}^{ref}$ One way of achieving a minimum in losses would be through an approach which often is used on transmission level as an application within Supervisory Control and Data Acquisition/Energy Management System (SCADA/EMS) software. The approach is referred to as Optimal Power Flow (OPF) and is essentially performed in two steps. The first step is based on communication of measured information, as obtained in substations in the system, and sent to a central location, e.g. a control room. Based on the measured information, together with known parameters of the system, a State Estimation (SE) is obtained, i.e. an estimation of all states, such as voltages and currents, in the system. As a second step, a minimization of losses would be obtained by solving an optimization problem, i.e. the OPF problem. There are several mathematical techniques for solving the optimization problem. Good search directions are typically found through use of gradient information as obtained through differentiation of the system equations. Typically, optimal reference values, minimizing losses while respecting voltage and current limits, are obtained as an outcome of an OPF. Once obtained, the optimal reference values would then be sent to the location of the control system of the MVDC link such that the losses can be reduced.

Contrary to transmission systems, distribution systems are not well measured and even if measurements are available, the information may not be communicated. It is difficult to establish a state estimation based on which an OPF could be performed.

Even if measurements were installed and communicated, there are at this time no OPF products available for distribution management, which includes MVDC links.

SUMMARY

One objective is to provide a method for transfer of power between medium voltage (MV) feeders in an MV direct current (DC) link in a power distribution network.

According to a first aspect there is presented a method for transfer of power between MV feeders via a MVDC link in a power distribution network is presented. The method is performed in a controller in the power distribution network and comprises setting an iteration step value for each of a set of power reference quantities of the MVDC link, and setting an initial value of each of the set of power reference quantities, iteratively changing values of each of the set of power reference quantities, and selecting one changed value of the set of power reference quantities by: changing a present value of each of the set of power reference quantities, one at a time, with the set iteration step value, respectively, into a new value, and measuring a total active power at a substation of the power distribution network for each of the new value, one at a time, and selecting the new value of the one of the set of power reference quantities that provides the lowest measured total active power at the substation, wherein a next iteration is performed with the selected new value as present value for the one of the set of power reference quantities and with the present value for the other of the set of power reference quantities.

The method may further comprise setting, after the setting step, an iteration stopping criterion for reduction of total active power, and determining, when the iteration stopping criterion has been fulfilled, after the changing step, a transfer of power between the MV feeders for the present values of the set of power reference quantities.

The iteration stopping criterion may be zero reduction.

The iterative step values for the set of power reference quantities may have the same absolute value.

The power distribution network may comprise two MV feeders, and the total active power is active power measured at primary substations for the two MV feeders added together.

The set of power reference quantities may comprise two or more of the following: voltage of a point of common coupling, PCC, for the MV feeders, active power injected by the MVDC link in the PCC for the MV feeders, and reactive power injected by the MVDC link in the PCC for the MV feeders.

The set of power reference quantities may comprise at least two of: voltage in a first side of a point of common connection, PCC, voltage in a second side of a PCC, active power in a first side of a PCC, active power in a second side of a PCC, reactive power in a first side of a PCC, and reactive power in a second side of a PCC.

According to an aspect there is presented a controller for transfer of power between MV feeders via a MVDC link in a power distribution network. The controller is configured to perform the steps of the presented method.

The controller may be a converter controller configured to control the MVDC link.

The controller may be a substation controller configured to control the substation.

By iteratively changing a set of power reference quantities for the MVDC link and measuring the total active power at the substation, it possible to establish reference points for an MVDC link such that losses are reduced, without performing a full optimization.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 7:
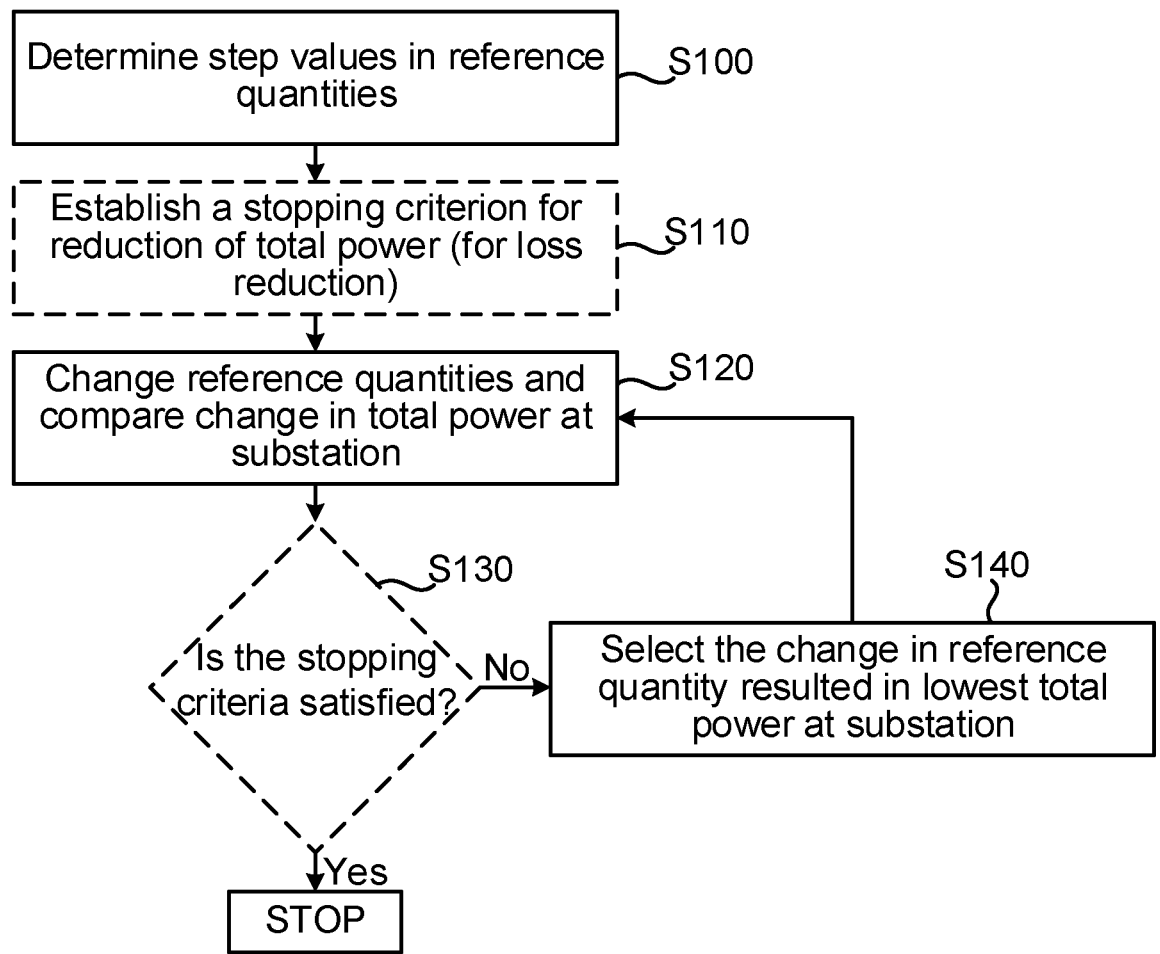
FIG. 7 is a flowchart schematically illustrating processing blocks according to a presented embodiment.

According to an aspect of the invention, an embodiment of a method for transfer of power between medium voltage (MV) feeders via a MV direct current (MVDC) link in a power distribution network is presented with reference to FIG. 7.

The method is performed in a controller 1 in the power distribution network. In processing block S100 an iteration step value is set for each of a set of power reference quantities of the MVDC link, and an initial value of each of the set of power reference quantities is set.

In processing blocks S120 and S140 values of each of the set of power reference quantities is iteratively changed, and one of the changed values of the set of power reference quantities is iteratively selected.

In processing block S120 a present value of each of the set of power reference quantities is changed, one at a time, with the set iteration step value, respectively, into a new value, and a total active power at a substation of the power distribution network is measured for each of the new value, one at a time.

In processing block S140 the new value of the one of the set of power reference quantities that provides the lowest measured total active power at the substation is selected. A next iteration is performed with the selected new value as present value for the selected one of the set of power reference quantities and with the present value for the other of the set of power reference quantities.

In optional processing block S110, after the processing block S100, an iteration stopping criterion is set for reduction of total active power.

In optional processing block S130, when the iteration stopping criterion has been fulfilled, after the processing block S120, a transfer of power is determined between the MV feeders for the present values of the set of power reference quantities.

The iteration stopping criterion may be zero reduction.

The iterative step values for the set of power reference quantities may have the same absolute value.

The power distribution network may comprise two MV feeders, and the total active power may be active power measured at the primary substation for the two MV feeders added together. The total active power may be measured at one or multiple measurement at the primary substation or below the primary substation, which can indicate the total loss reduction or increase with change in power reference quantity values.

The set of power reference quantities may comprise two or more of the following: voltage of a point of common coupling, PCC, for the MV feeders, active power injected by the MVDC link in the PCC for the MV feeders, and reactive power injected by the MVDC link in the PCC for the MV feeders.

The set of power reference quantities may comprise at least two of: voltage in a first side of a PCC, voltage in a second side of a PCC, active power in a first side of a PCC, active power in a second side of a PCC, reactive power in a first side of a PCC, and reactive power in a second side of a PCC.

Details of the presented embodiment is provided hereafter with reference to FIGS. 5 to 9.

Figure 1:
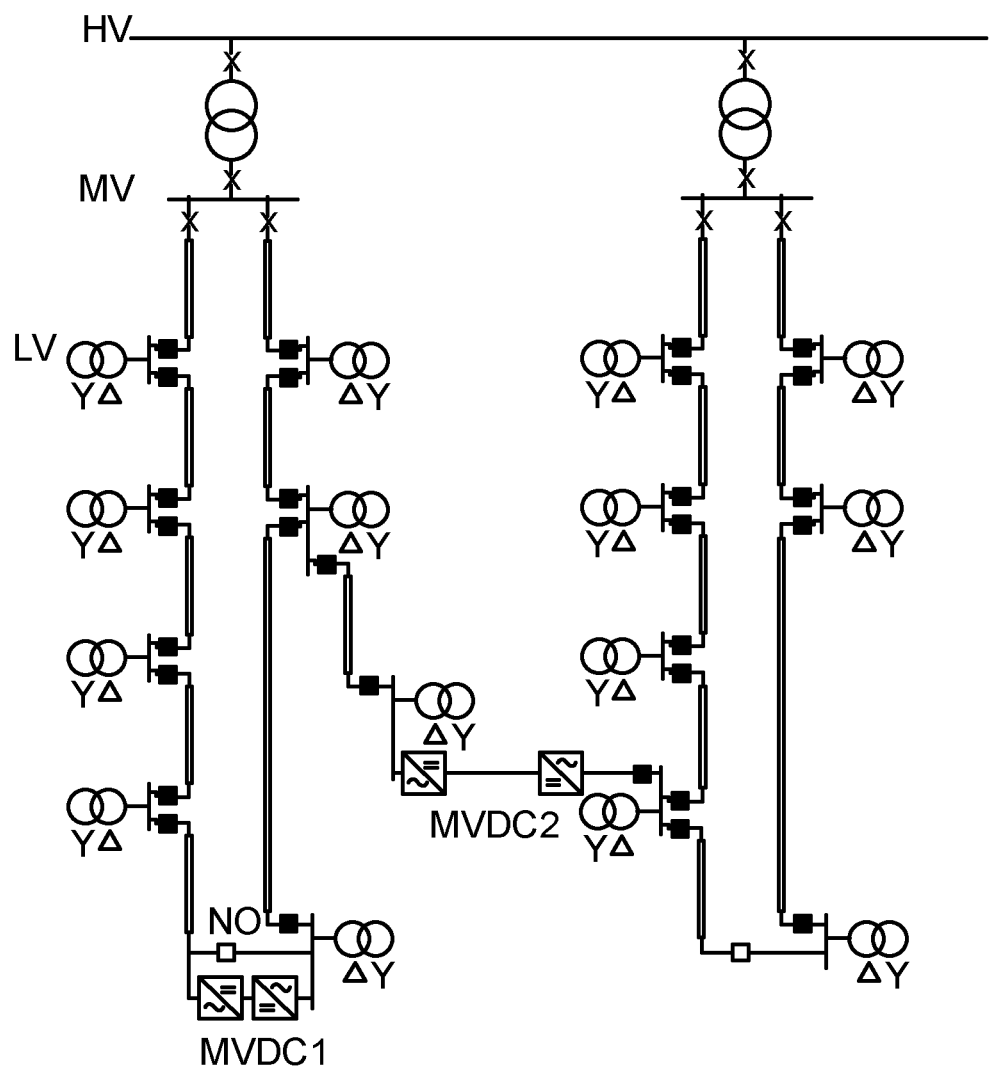
FIG. 1 is a diagram schematically illustrating a MV network with MVDC links installed between different feeders thereof.
Figure 2:
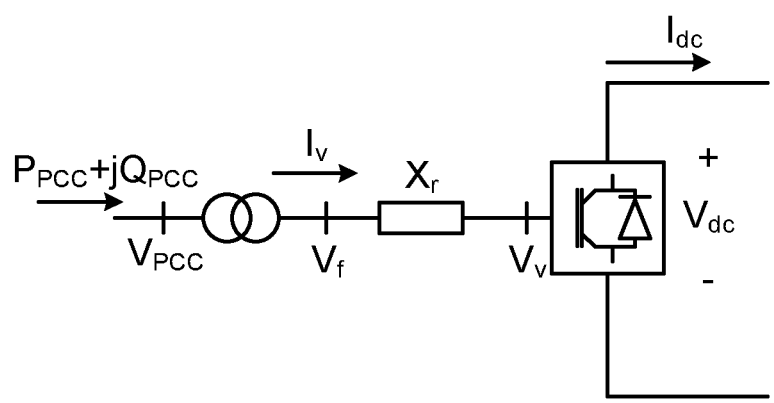
FIG. 2 is a diagram schematically illustrating some converter quantities.
Figure 3:
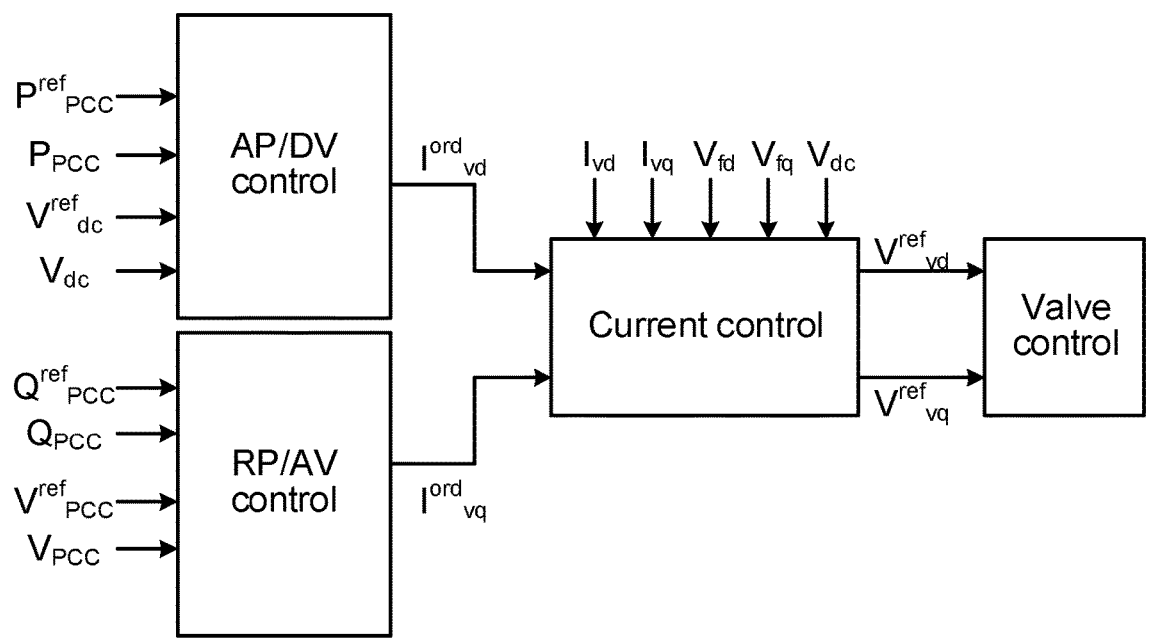
FIG. 3 is a diagram schematically illustrating a control structure for current vector control.
Figure 4:
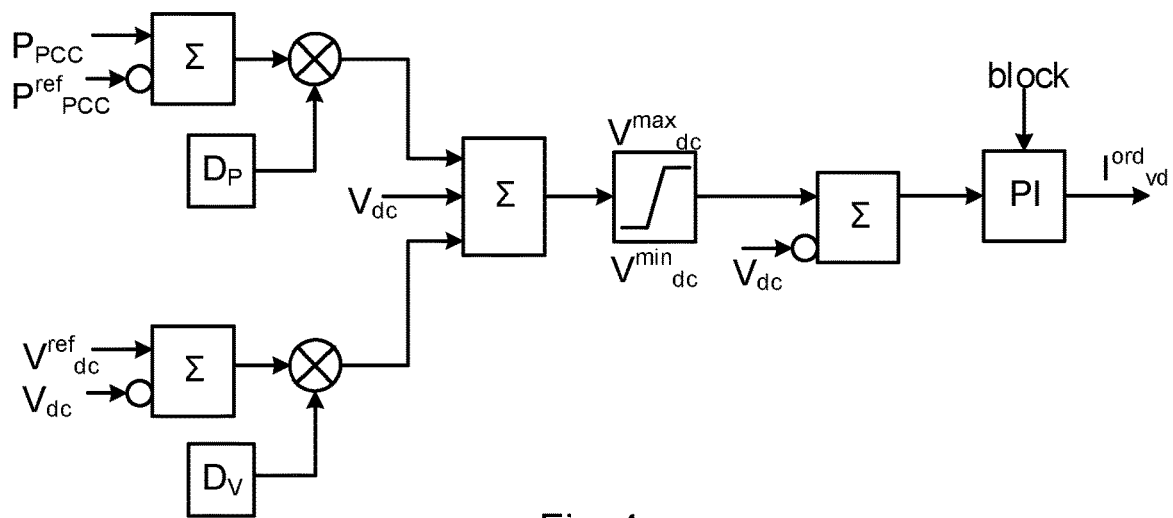
FIG. 4 is a diagram schematically illustrating an AP/DV control block of FIG. 3.
Figure 5:
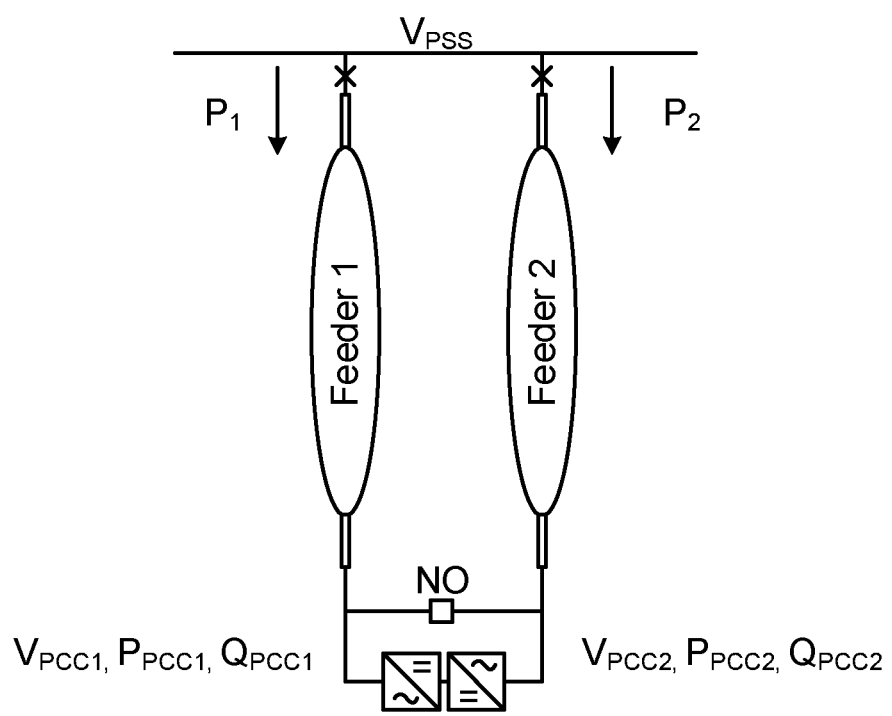
FIG. 5 is a diagram schematically illustrating measurement quantities according to a presented embodiment.

An MVDC link connected between two MV feeders is presented with reference to FIG. 5. The MVDC link is connected between two different feeders, Feeder 1 and Feeder 2. The MVDC link is illustrated with a back-to-back MVDC link connected parallel to a normally open (NO) switch. However, there may not be a parallel NO switch, and the MVDC link may not be a back-to-back link but rather a point-to-point link with a DC cable in-between the converters.

The voltage in the primary substation, $V_{PSS}$, is measured and so are also the active power fed into the top segment of the two feeders, i.e. $P_1$, $P_2$. Further, at each side of the PCC of the MVDC link, AC voltage, active power and reactive power are measured, i.e. $V_{PCC1}$, $P_{PCC1}$, $Q_{PCC1}$ for Feeder 1 and $V_{PCC2}$, $P_{PCC2}$, $Q_{PCC2}$ for Feeder 2.

In this example, converter 1 (i.e., the one connected to Feeder 1) is configured for active and reactive power control. Converter 2 (i.e., the one connected to Feeder 2) is on DC voltage control and reactive power control. To reduce power loss in the power distribution network reference values $P_{PCC1}^{ref}$, $Q_{PCC1}^{ref}$, $P_{PCC2}^{ref}$, $Q_{PCC2}^{ref}$, should be identified that minimizes losses while keeping other quantities (typically AC voltages and currents) within allowed limits.

DC side losses are typically minimized by keeping the DC voltage as high as possible. Thus, $P_{PCC1}^{ref}$, $Q_{PCC1}^{ref}$, $P_{PCC2}^{ref}$, remain to be determined.

The objective function $$\min_{P_{PCC1}^{ref}, Q_{PCC1}^{ref}, P_{PCC2}^{ref}} P_1 + P_2$$

should solved such that various (measured) AC quantities remain within limits.

The problem to solve is similar to what would be solved in the optimal power flow (OPF) problem described in the background. However, there are two major differences:

Instead of minimizing losses, which cannot easily be measured, the total power fed into the two feeders is minimized.

Instead of solving the minimization problem mathematically, it is done by actually changing the reference values in a structured fashion and observing the response in terms of the measured total power fed into the two feeders.

If the total active power, $P_{tot} = P_1 - P_2$, is reduced as $P_{PCC1}^{ref}$, $Q_{PCC1}^{ref}$, $P_{PCC2}^{ref}$, are changed there could be two reasons for this. Either the active losses or the active loads have been reduced. The active losses are mainly resistive losses in the transmission, i.e. $I^2R$ losses. The active loads may reduce as a consequence of dependence on voltage magnitudes. However, as long as the voltage magnitudes are kept within the stipulated limits, this should not be a problem. In other words, in practice the sum of active power fed into the feeders can be used as a proxy for active losses.

However, it follows that in particular the available voltage measurements should be observed to make sure that the voltage profile is kept in the agreed range. Further, also available current/power measurement should be observed to avoid overloading critical cable segments, in particular in situations when some cable segments are disconnected due to faults and some NO switches are closed to serve all customers.

Figure 6:
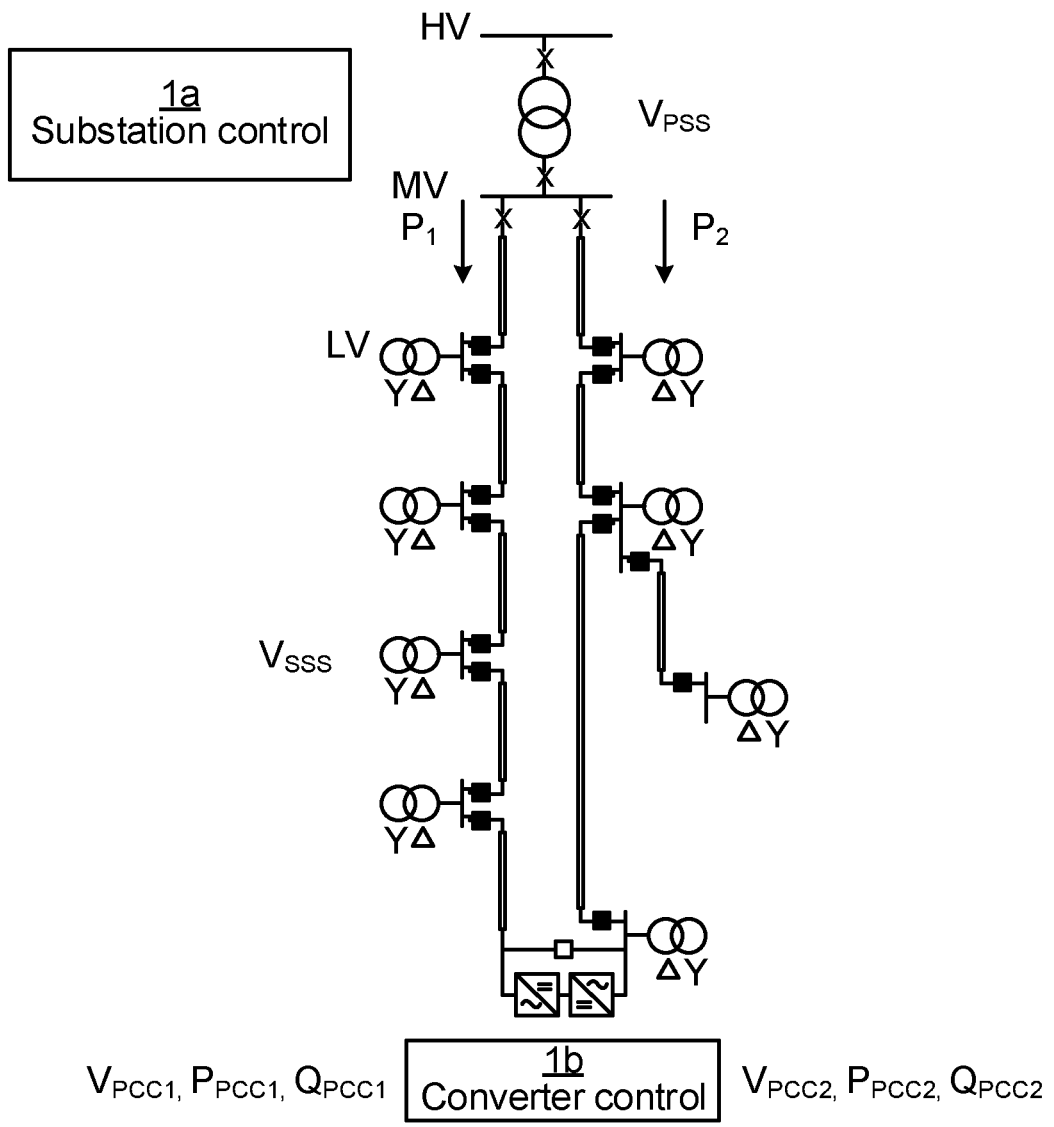
FIG. 6 is a diagram schematically illustrating different implementation configurations of a controller.

FIG. 6 illustrates where controller 1 of the process may be implemented. The controller may be implemented in the primary substation control 1$a$, or in the converter control 1$b$. The controller 1 may yet alternatively be implemented in a distribution management system (DMS) control (not illustrated).

In a DMS implementation the procedure can be executed by the operator of the power distribution network, with measurement of $P_1$, $P_2$, $V_{PSS}$, and $V_{PCC}$ and communicated (e.g., via SCADA) to a control room and that an operator in the control room then has the possibility to change the set-points or power reference quantities and see the response in total power while keeping voltages within a desired range. Measurements of the voltage in a subsidiary substation ($V_{sss}$) may further be communicated to the controller.

For implementation in a primary substation control 1$a$, measurements in the PCC $V_{PCC}$ and also of $V_{SSS}$ may be sent through communication to the primary substation, and the primary substation control 1$a$ is allowed to change the MVDC link set-points or power references quantities.

For implementation in a converter control 1$b$, measurements in the primary substation $P_1$, $P_2$, and $V_{PSS}$, and also of $V_{SSS}$ may be sent through communication to the converter control 1$b$.

Figure 8:
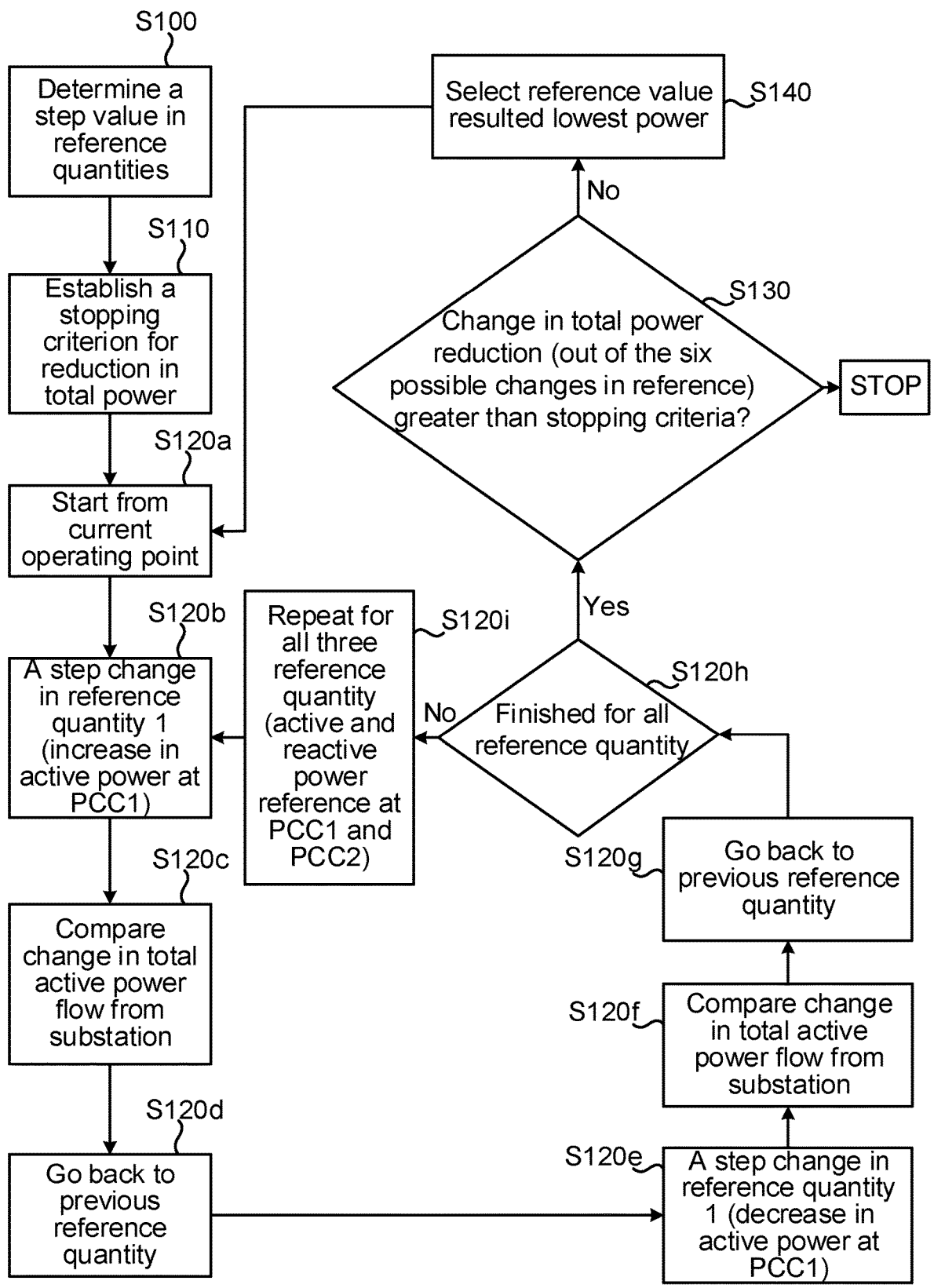
FIG. 8 is a flowchart schematically illustrating processing blocks according to a presented embodiment.

An embodiment of a method is presented with reference to FIG. 8, where one-by-one step change in active and reactive power reference quantities are illustrated in detail to check the change in total active power at the primary substation. The details of changing the reference values to reduce $P_{tot}$ is presented.

In processing block S100 a fixed step-size for each reference value, i.e. $\Delta P_{PCC1}{}^{ref}>0$, $\Delta Q_{PCC1}{}^{ref}>0$ and $\Delta P_{PCC2}{}^{ref}>0$, is determined.

In processing block S110 an iteration stopping criterion $\Delta P_{tot}{}^{ref}\leq 0$, is established such that if $\Delta P_{tot}>\Delta P_{tot}{}^{stop}$, then the minimum total active power has been reached (or at least close enough) for the give step size in reference values.

In processing block S120$a$ the current operating point is started with the reference values $P_{PCC1}{}^{ref,0}$, $Q_{PCC1}{}^{ref,0}$, $P_{PCC2}{}^{ref,0}$ and a measured total power $P_{tot}{}^{0}$.

In processing block S120$b$ an iteration step $P_{PCC1}{}^{ref,1}=P_{PCC1}{}^{ref,0}+P_{PCC1}{}^{ref}$ is taken and note through measurement and comparison in processing step S120$c$ $\Delta P_{tot}{}^{1}=P_{tot}(P_{PCC1}{}^{ref,1}, Q_{PCC1}{}^{ref,0}, Q_{PCC2}{}^{ref,0})-P_{tot}(P_{PCC1}{}^{ref,0}, Q_{PCC1}{}^{ref,0}, Q_{PCC2}{}^{ref,0})$.

In processing block S120$d$ return to $P_{PCC1}{}^{ref,0}$, $Q_{PCC1}{}^{ref,0}$, $Q_{PCC2}{}^{ref,0}$.

In processing block S120$e$ take an iteration step $P_{PCC1}{}^{ref,2}=P_{PCC1}{}^{ref,0}+\Delta P_{PCC1}{}^{ref}$ and note through measurement and comparison in processing step S12$f$ $\Delta P_{tot}{}^{2}=P_{tot}(P_{PCC1}{}^{ref,2}, Q_{PCC1}{}^{ref,0}, Q_{PCC2}{}^{ref,0})-P_{tot}(P_{PCC1}{}^{ref,0}, Q_{PCC1}{}^{ref,0}, Q_{PCC2}{}^{ref,0})$.

In processing block S120$g$ return to $P_{PCC1}{}^{ref,0}$, $Q_{PCC1}{}^{ref,0}$, $Q_{PCC2}{}^{ref,0}$.

Take an iteration block $Q_{PCC1}{}^{ref,1}=Q_{PCC1}{}^{ref,0}+\Delta Q_{PCC1}{}^{ref}$ and note through measurement and comparison $\Delta P_{tot}{}^{3}=P_{tot}(P_{PCC1}{}^{ref,0}, Q_{PCC1}{}^{ref,1}, Q_{PCC2}{}^{ref,0})-P_{tot}(P_{PCC1}{}^{ref,0}, Q_{PCC1}{}^{ref,0}, Q_{PCC2}{}^{ref,0})$.

Return to $P_{PCC1}{}^{ref,0}$, $Q_{PCC1}{}^{ref,0}$, $Q_{PCC1}{}^{ref,0}$.

In processing block S120$h$, check if all reference quantities have been processed. When all reference quantities have not been processed, proceed to processing block S120$i$.

Take an iteration step $Q_{PCC2}{}^{ref,2}=Q_{PCC1}{}^{ref,0}+\Delta Q_{PCC1}{}^{ref}$ and note through measurement and comparison $\Delta P_{tot}{}^{4}=P_{tot}(P_{PCC1}{}^{ref,0}, Q_{PCC1}{}^{ref,2}, Q_{PCC2}{}^{ref,0})-P_{tot}(P_{PCC1}{}^{ref,0}, Q_{PCC1}{}^{ref,0}, Q_{PCC2}{}^{ref,0})$.

Return to $P_{PCC1}{}^{ref,0}$, $Q_{PCC1}{}^{ref,0}$, $Q_{PCC2}{}^{ref,0}$.

Take an iteration step $Q_{PCC2}{}^{ref,2}=Q_{PCC2}{}^{ref,0}+\Delta Q_{PCC2}{}^{ref}$ and note through measurement and comparison $\Delta P_{tot}{}^{5}=P_{tot}(P_{PCC1}{}^{ref,0}, Q_{PCC1}{}^{ref,0}, Q_{PCC2}{}^{ref,1})-P_{tot}(P_{PCC1}{}^{ref,0}, Q_{PCC1}{}^{ref,0}, Q_{PCC2}{}^{ref,0})$.

Return to $P_{PCC1}{}^{ref,0}$, $Q_{PCC1}{}^{ref,0}$, $Q_{PCC2}{}^{ref,0}$.

Take an iteration step $Q_{PCC2}{}^{ref,1}=Q_{PCC1}{}^{ref,0}+\Delta Q_{PCC2}{}^{ref}$ and note through measurement and comparison $\Delta P_{tot}{}^{5}=P_{tot}(P_{PCC1}{}^{ref,0}, Q_{PCC1}{}^{ref,0}, Q_{PCC2}{}^{ref,1})-P_{tot}(P_{PCC1}{}^{ref,0}, Q_{PCC1}{}^{ref,0}, Q_{PCC2}{}^{ref,0})$.

Return to $P_{PCC1}{}^{ref,0}$, $Q_{PCC1}{}^{ref,0}$, $Q_{PPC2}{}^{ref,0}$.

In processing block S120$h$, when all reference quantities have been processed, proceed to processing block S130.

In processing block S13$o$, when all $\Delta P_{tot}{}^{1}$, $\Delta P_{tot}{}^{2}$, $\Delta P_{tot}{}^{3}$, $\Delta P_{tot}{}^{4}$, $\Delta P_{tot}{}^{5}$, $\Delta P_{tot}{}^{6}>\Delta P_{tot}{}^{stop}$ stop the process, as the minimum total active power has been reached. Otherwise proceed to processing block S140 to select the reference value that resulted in the lowest power and proceed to processing block S120$a$ with the selected reference value as the new starting point.

The step size in reference quantities and stopping criteria may be selected based on network structure, substation power, resolution, and accuracy of the measuring units. It may also depend on what can be detected at the substation based on connected load variations and power flow.

A large step size may result in significant changes in power flow while a very small step size may require several steps to achieve the desired value. A large stopping criterion may not reach a very suitable loss reduction while a very small stopping criteria can lead to numerous numbers of steps in reference changes.

Once the minimum has been reached, no further actions are required, however as the operating conditions may change, due e.g. to changing loads, the algorithm may be restarted with regular intervals (if the changes in operating conditions are small enough, no steps are actually taken).

If one or both converters is/are on AC voltage control the corresponding fixed step in reactive power reference $\Delta Q_{PCCx}{}^{ref}>0$ should be replaced with a corresponding step in AC voltage reference $\Delta V_{PCCx}{}^{ref}>0$.

There may be natural variations in load, making it harder to distinguish between load variations and the effect of a change in reference values. It is advantageous if the change in reference value and measurement of total power are coordinated in time, such that the step in reference value first is executed and then immediately afterwards, the measurement is performed.

Typical step values may be $\Delta P_{PCC1}{}^{ref}=300$ [kW], $\Delta Q_{PCC1}{}^{ref}=300$ [kVar], $\Delta Q_{PCC2}{}^{ref}=300$ [kVar], and may be $\Delta P_{tot}{}^{stop}=0$, i.e. the algorithm will continue if there a reduction is possible. Initially, all references may be zero.

Figure 9:
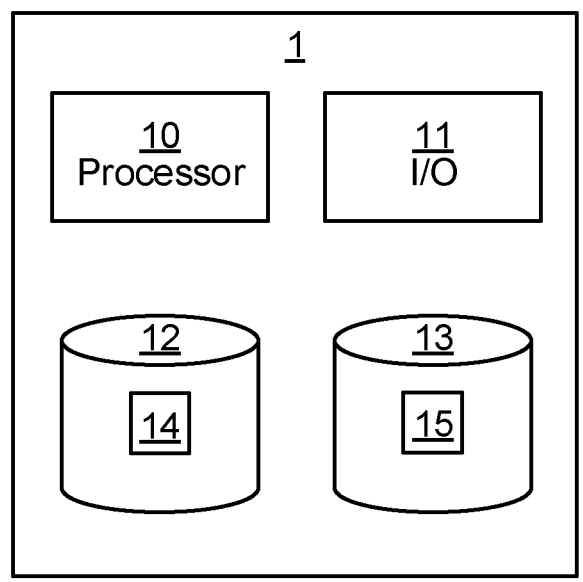
FIG. 9 is a diagram schematically illustrating some components of a controller according to a presented embodiment.

According to an aspect, an embodiment of a controller 1 for transfer of power between MV feeders via an MVDC link in a power distribution network is presented with reference to FIG. 9. The controller 1 is configured to setting an iteration step value for each of a set of power reference quantities, and setting an initial value of each of the set of power reference quantities, iteratively changing values of each of the set of power reference quantities, and selecting one changed value of the set of power reference quantities by: changing a present value of each of the set of power reference quantities, one at a time, with the set iteration step value, respectively, into a new value, and measuring a total active power at a substation of the power distribution network for each of the new value, one at a time, and selecting the new value of the one of the set of power reference quantities that provides the lowest measured total active power at the substation, wherein a next iteration is performed with the selected new value as present value for the one of the set of power reference quantities and with the present value for the other of the set of power reference quantities.

FIG. 9 is a schematic diagram showing some components of the controller 1. A processing circuitry 10 may be provided using any combination of one or more of a suitable central processing unit, CPU, multiprocessing circuitry, microcontroller, digital signal processing circuitry, DSP, application specific integrated circuit etc., capable of executing software instructions of a computer program 14 stored in a memory 12. The memory can thus be considered to be or form part of the computer program product 12. The processing circuitry 10 may be configured to execute methods described herein with reference to FIG. 7 or 8.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processing circuitry 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g., hold other software instructions 15, to improve functionality for the controller 1.

The controller 1 may further comprise an input/output (I/O) interface 11 including e.g., a user interface. The controller 1 may further comprise a receiver configured to receive signalling from other nodes, and a transmitter configured to transmit signalling to other nodes. Other components of the controller 1 are omitted in order not to obscure the concepts presented herein.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

The invention claimed is:

1. A method for transfer of power between medium voltage, MV, feeders via a MV direct current, MVDC, link in a power distribution network, the method being performed in a controller in the power distribution network and comprising:

setting an iteration step value for each of a set of power reference quantities of the MVDC link, and setting an initial value for each of the set of power reference quantities;

iteratively changing values of each of the set of power reference quantities, and selecting one changed value of the set of power reference quantities by:

changing a present value of each of the set of power reference quantities, one at a time, with the set iteration step value, respectively, into a new value, and measuring a total active power at a substation of the power distribution network for each of the new values, one at a time; and selecting the new value of one of the set of power reference quantities that provides a lowest measured total active power at the substation, wherein a next iteration is performed with the selected new value as present value for the one of the set of power reference quantities and with the present value for all other of the set of power reference quantities.

2. The method as claimed in claim 1, further comprising:
setting, after the setting step, an iteration stopping criterion for reduction of total active power; and
determining, when the iteration stopping criterion has been fulfilled, after the changing step, a transfer of power between the MV feeders for the present values of the set of power reference quantities.

3. The method as claimed in claim 2, wherein the iteration stopping criterion is zero reduction.

4. The method as claimed in claim 2, wherein the iteration step values for the set of power reference quantities have absolute values that are the same.

5. The method as claimed in claim 2, wherein the power distribution network comprises two MV feeders, and the total active power is active power measured at primary substations for the two MV feeders added together.

6. The method as claimed in claim 2, wherein the set of power reference quantities comprise two or more of the following: voltage of a point of common coupling, PCC, for the MV feeders, active power injected by the MVDC link in the PCC for the MV feeders, and reactive power injected by the MVDC link in the PCC for the MV feeders.

7. The method as claimed in claim 2, wherein the set of power reference quantities comprises at least two of: voltage in a first side of a point of common connection, PCC, voltage in a second side of a PCC, active power in a first side of a PCC, active power in a second side of a PCC, reactive power in a first side of a PCC, and reactive power in a second side of a PCC.

8. The method as claimed in claim 1, wherein the iteration step values for the set of power reference quantities have absolute values that are the same.

9. The method as claimed in claim 1, wherein the power distribution network comprises two MV feeders, and the total active power is active power measured at primary substations for the two MV feeders added together.

10. The method as claimed in claim 1, wherein the set of power reference quantities comprise two or more of the following: voltage of a point of common coupling, PCC, for the MV feeders, active power injected by the MVDC link in the PCC for the MV feeders, and reactive power injected by the MVDC link in the PCC for the MV feeders.

11. The method as claimed in claim 1, wherein the set of power reference quantities comprises at least two of: voltage in a first side of a point of common connection, PCC, voltage in a second side of a PCC, active power in a first side of a PCC, active power in a second side of a PCC, reactive power in a first side of a PCC, and reactive power in a second side of a PCC.

12. A controller for transfer of power between medium voltage, MV, feeders via a MV direct current, MVDC, link in a power distribution network, the controller being configured to:

set an iteration step value for each of a set of power reference quantities of the MVDC link, and set an initial value for each of the set of power reference quantities;

iteratively change values of each of the set of power reference quantities, and select one changed value of the set of power reference quantities by:

changing a present value of each of the set of power reference quantities, one at a time, with the set iteration step value, respectively, into a new value, and measuring a total active power at a substation of the power distribution network for each of the new values, one at a time; and selecting the new value of one of the set of power reference quantities that provides a lowest measured total active power at the substation, wherein a next iteration is performed with the selected new value as present value for the one of the set of power reference quantities and with the present value for all other of the set of power reference quantities.

13. The controller as claimed in claim 12, wherein the controller is a converter controller configured to control the MVDC link.

14. The controller as claimed in claim 12, wherein the controller is a substation controller configured to control the substation.

* * * * *